Figure 1:
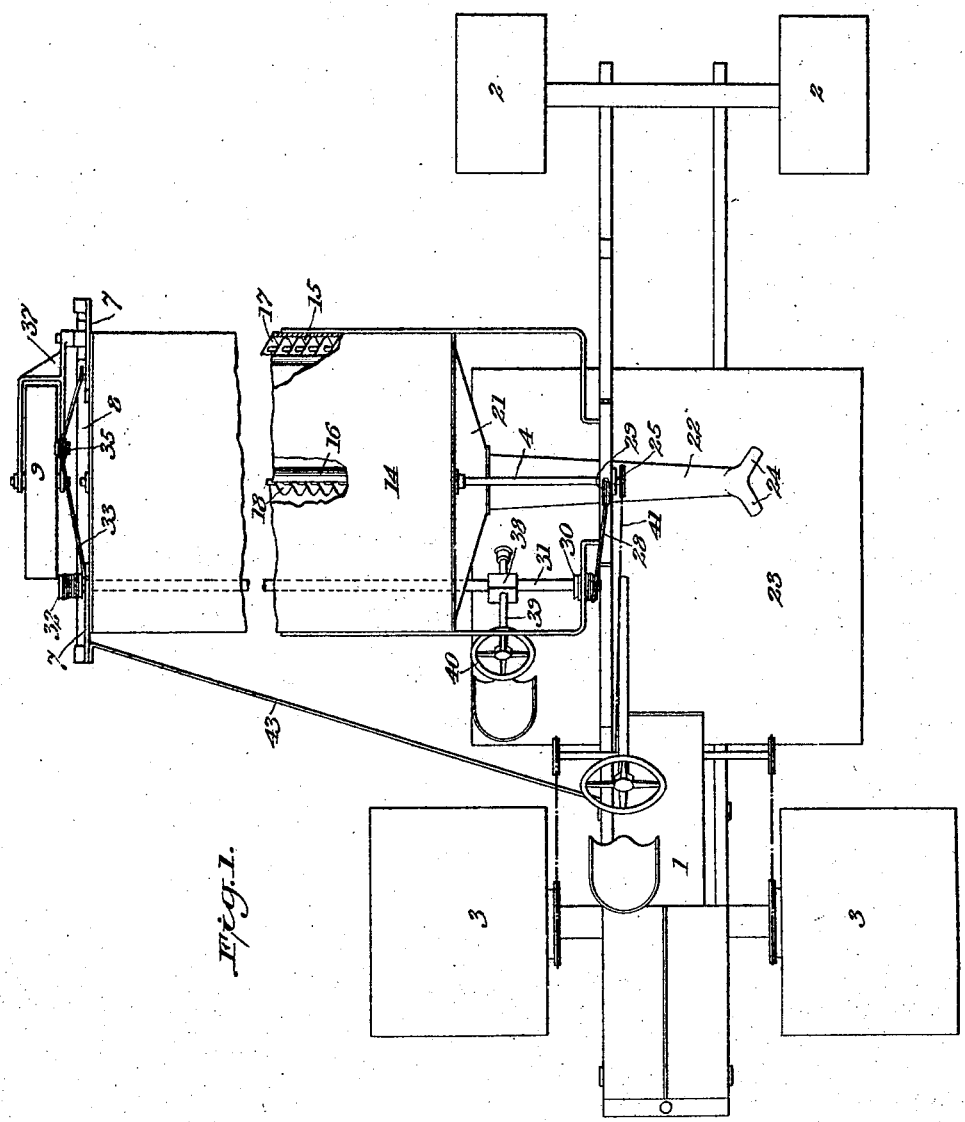

G. I. DILL.
MACHINE FOR HARVESTING RICE AND THE LIKE.
APPLICATION FILED MAY 24, 1920.

1,418,542.

Patented June 6, 1922.

Inventor
George I. Dill
by
Wm H. Finerel
Attorney

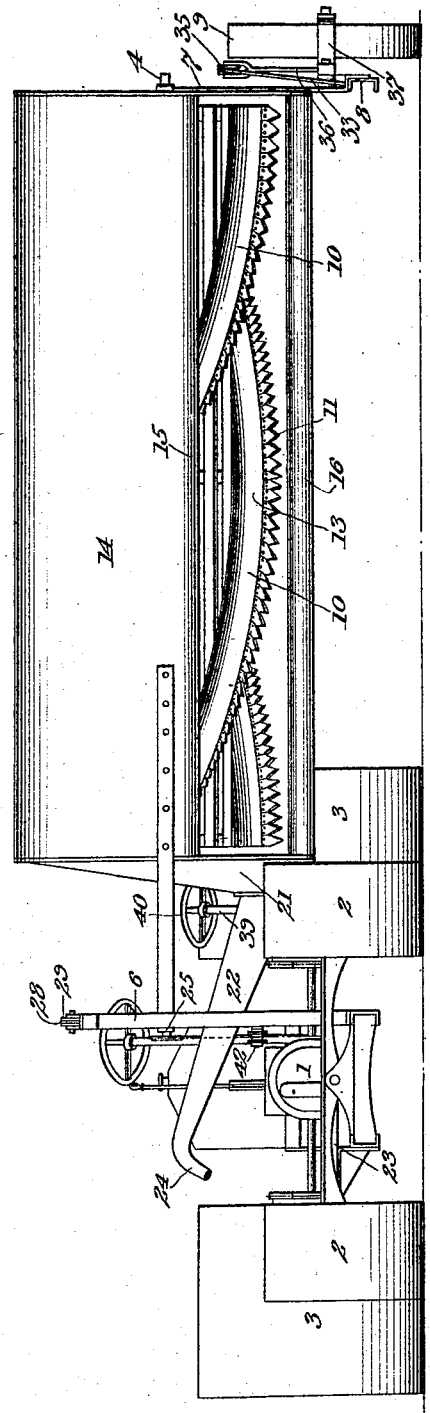

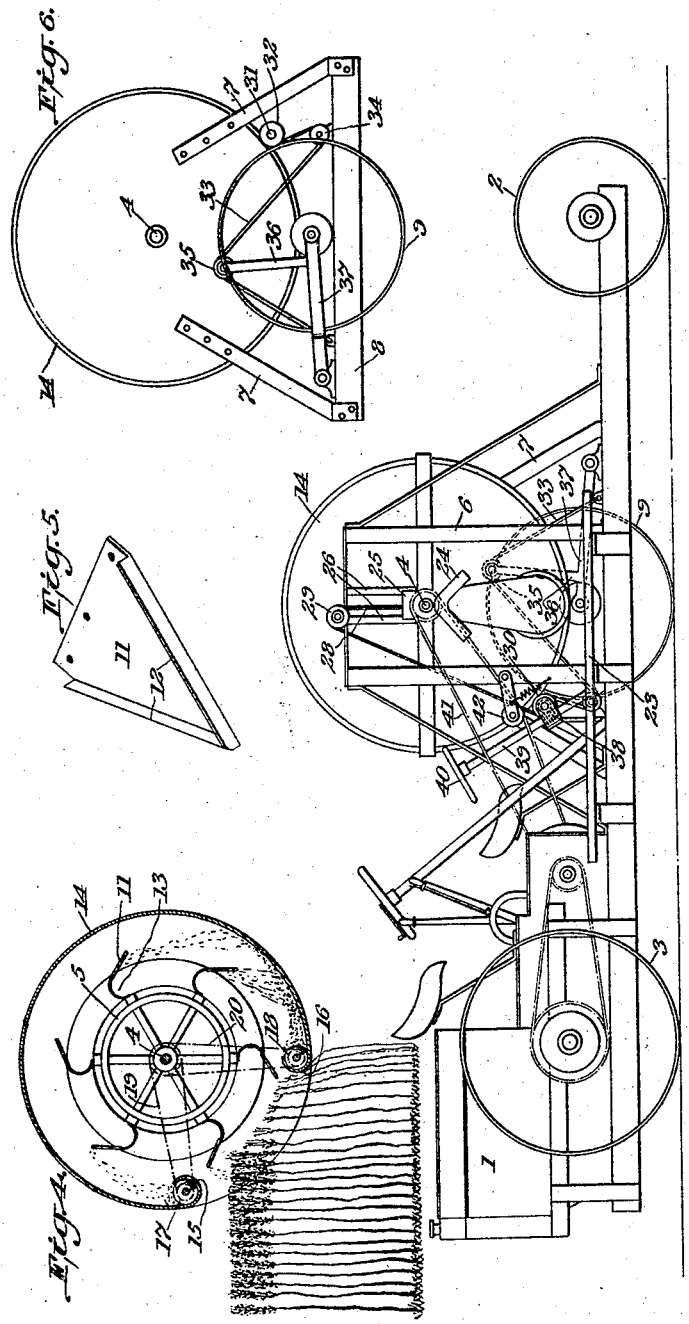

UNITED STATES PATENT OFFICE.

GEORGE I. DILL, OF LITTLE ROCK, ARKANSAS.

MACHINE FOR HARVESTING RICE AND THE LIKE.

1,418,542.   Specification of Letters Patent.   Patented June 6, 1922.

Application filed May 24, 1920. Serial No. 383,946.

*To all whom it may concern:*

Be it known that I, GEORGE I. DILL, a citizen of the United States, residing at Little Rock, in the county of Pulaski and State of Arkansas, have invented a certain new and useful Improvement in Machines for Harvesting Rice and the like, of which the following is a full, clear, and exact description.

The object of this invention is to provide a harvester capable of stripping the grain or heads of grain from the standing stalk or plant in the field and bagging the grain. The invention has been designed particularly for thus harvesting rice, which is a crop that must be gathered promptly upon maturity.

As usually practiced, rice is harvested by cutting the stalks or plants with an ordinary cutter or cutter and binder, and binding it in sheaves which are shocked and then hauled from the field and threshed. Rice is a grain that shatters and falls off the straw very readily, and when harvested as described there is very considerable loss of grain.

By my invention the heads are stripped in the field from the standing plants or stalks, and the grain bagged in consecutive operations and by one machine.

The invention consists of a harvesting machine adapted to be worked by animal or mechanical power, and having means to strip the grain from the stalks or plants while standing in the field, threshing it and bagging it in consecutive operations, and without interrupting the stripping operation, as I will proceed now to explain and finally claim.

In the accompanying drawings illustrating the invention, in the several figures of which like parts are similarly designated, Figure 1 is a top plan view of my machine mounted upon a tractor, as I prefer to use it. Fig. 2 is a front elevation. Fig. 3 is a side elevation. Fig. 4 is a detail elevation of the stripper showing it in operation upon the standing stalks or plants. Fig. 5 is a perspective view of one of the stripper teeth or fingers drawn on a larger scale. Fig. 6 is a side elevation illustrating an adjusting mechanism for the stripper.

The tractor shown is substantially that shown in my Patent No. 1,180,257, dated April 18, 1916, although the invention is not limited to the use of that particular power machine; and, furthermore, the invention may be used in connection with an animal power truck or vehicle of any suitable construction, preferably such as will furnish power for the operation of the harvester mechanism.

The chassis is shown as having the motor mechanism 1 arranged at the rear, and the front wheels 2 may have narrower rims than the rear or tractor wheels 3.

4 is the main shaft of a stripper reel, 5, extending off from one side of the tractor, and here shown as mounted in a frame 6 carried by the chassis and a frame 7 carried by a frame 8 having an adjustable supporting wheel 9.

The stripper reel is composed of a series of spirally arranged stripper bars 10 extending lengthwise of the reel, and having their leading edges provided with stripper teeth or fingers 11 preferably such as shown in detail in Fig. 5. The converging edges of these teeth are provided with upstanding flanges 12, which come into contact with the straw or stalks and grain and strip and catch the grain and throw it back into the troughs 13 of the stripper bars, whence it is conveyed to the delivery mechanism presently described. The use of the V-shaped teeth with flanged edges tapering to the leading end is further advantageous in that these teeth part or separate the standing straw or plants and strip off the grain without undue wear upon the teeth, thus prolonging their life. The reel is encased in a stationary hood 14 mounted upon the frames 6 and 7 and 8 and open at its lower front portion as shown in Fig. 4, to give the heads of the standing grain immediate entrance into the hood and thereby expose the teeth for action upon the grain to strip the heads from the stalks without the intervention of gatherers. The opposite edges of the front opening of this hood are provided with longitudinally arranged catch-basins 15 and 16, in which are arranged screw or other conveyors 17 and 18 which receive the grain from the stripper teeth and troughs. These screw-conveyors may be driven in any suitable way, as by belts 19 and 20, or gearing extending from the stripper reel shaft 4. These screw-conveyors convey the grain to an elevator box or hopper 21 at the inner end of the hood, from which it is drawn by an elevator 22 of any suitable construction, which rises above a platform 23 on the tractor or truck, and has any number of spouts 24 for use in bagging or sacking the grain.

In order to adjust the stripper reel to different heights of grain, one end of its main shaft 4 is mounted in a bearing 25 suitably housed as at 26 in frame 6, and the other end is carried by the frame 7, or the outer end 27 of the hood, which may be a part of the frame. The bearing and the frame 7 may be adjusted by any suitable means operating conjointly or separately, as desired, and as here shown, the bearing is connected by a flexible medium 28, such as a cable or chain, extending over the pulley 29 and thence to a winding drum 30 on a shaft 31. This shaft may extend across the machine and at its outer end be provided with a drum 32. This drum has fastened to it one end of a flexible device 33, such as a cable or chain, the other end of which is secured to the frame 8, said flexible device passing from the drum 32 under a pulley 34 and over a pulley 35 which is supported in an upright 36 rising from a yoke 37, pivotally mounted on the frame 8 at one end and carrying the axle of the wheel 9 at its other end. Thus the relation of the wheel to the frame may be varied to raise or lower it and the stripping reel. Rotation of the drum 32 obviously effects the effective length of the connecting medium 33 and consequently serves to raise or lower the stripper reel synchronously with the movement of the flexible connecting medium 28. The shaft 31 may be turned by any suitable means, as by a worm and worm-wheel mechanism 38, operated by a shaft 39 and hand-wheel 40.

The shaft 4 is shown as geared to the motor shaft by a chain 41; and any suitable slack take-up 42 may be used on the chain to compensate for variations in elevation of the stripper reel.

The stripper mechanism may be braced from the chassis or other truck mechanism, as for example, by a brace rod or brace rods 43, and as shown in Fig. 1, this brace rod may extend from the near side frame of the chassis to the frame 8, or it may be otherwise disposed in order to get an adequate resistance to the strain or thrust imposed upon the stripper mechanism by its contact with or operation upon the grain.

As will be seen, the platform 23 is of sufficient area to accommodate any requisite number of persons to bag or sack the grain.

The hood enclosing the stripper reel confines the operation of the stripper bars or teeth to the grain immediately in front of them and so saves from harm the grain outside of this area. The catch-basins 15 and 16 gather any grain that might hang to the teeth or be drawn off without an outward movement.

The stripper teeth are so arranged that they hit the standing grain with an upward cut, striking the straw below the heads of grain, and with the upward movement the teeth will strip the grain off of the straw, whence it falls back into the catch-troughs 13, or into the catch-basins 15 and 16, whence it is delivered into the hopper.

By the use of my machine, there is no shattering or scattering or waste of the grain, and the crop, especially rice, may be gathered quickly and economically.

It is my purpose to so construct the harvester that it may be removably mounted upon the tractor or truck so as to permit the use of the latter for other purposes.

Variations in the details of construction and arrangement of parts are permissible within the principle of the invention and the claims following.

What I claim is:—

1. In a machine for harvesting rice and the like, means for stripping the heads from the standing grain, comprising a rotary reel provided with a series of teeth arranged spirally in the direction of the length of the reel, and a hood in which the reel is enclosed, said hood having a front opening located at its lower portion and of sufficient size to permit the entrance of the heads on the standing grain into the hood and exposing such heads to the direct stripping action of the teeth.

2. A machine for harvesting rice and the like, having a stripping reel for stripping the heads of the grain from the stalks and comprising a number of rows of stripping teeth arranged spirally around the reel, and a hood in which the reel is enclosed, said hood having a front opening located at its lower portion and of sufficient size to permit the entrance of the heads on the standing grain into the hood and exposing such heads to the direct stripping action of the teeth.

3. A machine for harvesting rice and the like, having a rotary stripper reel provided with stripper teeth arranged in spirally disposed rows, each row of teeth having a trough at its back to catch the stripped grain.

4. A machine for harvesting rice and the like, having a rotary stripper reel, a hood enclosing said reel and open at front to expose the reel and provided with grain-catching basins adjacent to said open front, and means cooperating with said basins to deliver the grain to a disposal apparatus.

5. A machine for harvesting rice and the like, having a stripping reel for stripping the heads of grain from the standing stalks or plants, and a hood enclosing said reel and provided with a front opening so that the stripping mechanism may act upon the standing grain, said hood terminating in catch-basins at opposite sides of said opening.

6. A machine for harvesting rice and the like, having a stripping reel for stripping the heads of grain from the standing stalks or plants, a hood enclosing said reel and provided with a front opening so that the stripping mechanism may act upon the standing grain, said hood having catch-basins arranged longitudinally at opposite edges of said opening, and screw-conveyors arranged in said catch-basins.

7. A machine for harvesting rice and the like, having a stripping reel for stripping the heads of grain from the standing stalks or plants, a hood enclosing said reel and provided with a front opening so that the stripping mechanism may act upon the standing grain, said front opening having longitudinally arranged catch-basins, screw-conveyors arranged in said catch-basins, and a hopper at one end of said hood into which the grain is conveyed.

8. A machine for harvesting rice and the like, having a stripping reel for stripping the heads of grain from the standing stalks or plants, a hood enclosing said reel and provided with a front opening so that the stripping mechanism may act upon the standing grain, said hood provided with longitudinally disposed catch-basins opposite said opening, screw-conveyors arranged in said catch-basins, a hopper at one end of said hood into which the grain is conveyed, and an elevator for taking the grain from the hopper to a position where it may be bagged or sacked.

9. A machine for harvesting rice and the like, having a chassis, a rotary reel mounted upon the chassis and extending off from one side thereof and having stripping bars exposed in the direction of travel of the machine and thereby adapted to strip the heads of grain from the standing stalks, and means for changing the elevation of said reel to adapt it to varying heights of grain.

10. In a machine for harvesting rice and the like, the combination of a tractor, and a stripper reel mounted thereon and driven thereby and extending out laterally beyond the tractor and there provided with a supporting means and means interposed between the tractor and reel for bodily adjusting the reel to the height of the rice and the like.

11. In a machine for harvesting rice and the like, the combination of a tractor, a stripper reel mounted thereon and driven thereby and extending out laterally beyond the tractor and there provided with a supporting means, and reel adjusting mechanism arranged at its opposite ends and connecting it with the tractor and operable from the tractor to bodily adjust the reel to the height of the rice.

In testimony whereof I have hereunto set my hand this 20th day of May, A. D. 1920.

GEORGE I. DILL.

Witnesses.
 FLOY NELMS,
 J. G. GANT.